United States Patent
Lee et al.

(10) Patent No.: US 7,929,566 B2
(45) Date of Patent: Apr. 19, 2011

(54) TERMINAL AND METHOD FOR MANAGING BANDWIDTH OF TERMINAL

(75) Inventors: Seung-Que Lee, Daejeon (KR); Nam-Hoon Park, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom, Inc. (KR)

( * ) Notice: Subject to any disclaimer, the term of this patent is extended or adjusted under 35 U.S.C. 154(b) by 1092 days.

(21) Appl. No.: 11/636,783

(22) Filed: Dec. 11, 2006

(65) Prior Publication Data

US 2007/0133402 A1     Jun. 14, 2007

(30) Foreign Application Priority Data

Dec. 9, 2005   (KR) .................. 10-2005-0120767

(51) Int. Cl.
   *H04J 3/16*     (2006.01)
(52) U.S. Cl. ............... 370/468; 370/392.21; 370/395.2; 370/329
(58) Field of Classification Search ............. 370/392.21, 370/395.2, 329, 468
See application file for complete search history.

(56) References Cited

U.S. PATENT DOCUMENTS

| | | | |
|---|---|---|---|
| 7,325,250 B1 * | 1/2008 | Barclay et al. .................. | 726/14 |
| 7,548,534 B2 * | 6/2009 | Zimmerman et al. ........ | 370/346 |
| 2006/0274685 A1 * | 12/2006 | Johnson et al. ............... | 370/328 |
| 2008/0144568 A1 * | 6/2008 | Usuda et al. .................. | 370/329 |

FOREIGN PATENT DOCUMENTS

| | | |
|---|---|---|
| KR | 1020010095384 | 11/2001 |
| KR | 1020050089686 | 9/2005 |
| WO | WO 03/096626 | 11/2003 |

* cited by examiner

*Primary Examiner* — Huy D Vu
*Assistant Examiner* — Kibrom T Hailu
(74) *Attorney, Agent, or Firm* — The Farrell Law Firm, P.C.

(57) ABSTRACT

A terminal includes a higher level bandwidth manager and a lower level bandwidth manager. The higher level bandwidth manager generates a guaranteed access request message including size information of a bandwidth corresponding to user data, transmits the guaranteed access request message, and transmits a user data transmission message including the user data. The lower level bandwidth manager uses the guaranteed access request message transmitted from the higher level bandwidth manager, generates a bandwidth request message using a guaranteed access, transmits the bandwidth request message to a base station, obtains the user data from the user data transmission message when receiving a bandwidth allocation signal from the base station, and transmits the user data to the base station.

5 Claims, 4 Drawing Sheets

TERMINAL AND METHOD FOR MANAGING BANDWIDTH OF TERMINAL

PRIORITY

This application claims priority to Korean Patent Application No. 10-2005-0120767 filed in the Korean Intellectual Property Office on Dec. 9, 2005, the contents of which are incorporated herein by reference.

BACKGROUND OF THE INVENTION

1. Field of the Invention

The present invention generally relates to a bandwidth management method of a terminal, and in particular, the present invention relates to a bandwidth management method of a terminal in a portable Internet system.

2. Description of the Related Art

A portable Internet system uses an Orthogonal Frequency Division Multiplexing (OFDM) method for modulation and demodulation, and uses a Frequency Division Multiple Access (FDMA) or a Time Division Multiple Access (TDMA) method for user multiplexing. In addition, the portable Internet system uses a centralized bandwidth controlling method, in which the terminal requests bandwidth from a base station, obtains required bandwidth, and provides data to the bandwidth to transmit the data to the base station.

In a conventional bandwidth management method, the bandwidth is appropriately distributed and managed between application programs according to a priority and a requirement. That is, the conventional bandwidth management method includes a configuration for appropriately distributing the obtained bandwidth to the application program. However, in the conventional bandwidth management method, a bandwidth request according to a current state of a terminal is not managed.

When requesting the required bandwidth from the base station, a terminal system uplink-transmits data including bandwidth information. In this case, two methods are used, which include a guaranteed access for transmitting information to a position assigned by the base station, and a random access in which terminals compete with each other to transmit the information.

In addition, since there are a calculation and analysis process and a transmission process in a terminal bandwidth management process, the bandwidth may be efficiently managed when the terminal bandwidth management process is divided into a time-sensitive process and a process that is less time-sensitive.

Accordingly, when the terminal manages the bandwidth in the portable Internet system, it is required to provide a bandwidth controlling method for selecting an access method and to divide processes according to a state of the terminal.

SUMMARY OF THE INVENTION

The present invention has been made in an effort to provide a bandwidth management method for managing a bandwidth while dividing a bandwidth management configuration into a higher level bandwidth manager and a lower level bandwidth manager.

According to an aspect of the present invention, a method for managing a bandwidth in a terminal includes calculating the bandwidth required for the terminal device determining whether a traffic connection identifier exists in the terminal; comparing a transmission frequency of uplink data to a reference threshold when the traffic connection identifier exists, and requesting the bandwidth by a guaranteed access when the transmission frequency is higher than the reference threshold value.

In this case, it is determined whether a network address has been allocated to the terminal, and the transmission frequency is compared to the reference threshold when the network address has been allocated to the terminal device.

In addition, the bandwidth may be requested by a random access when the traffic connection identifier does not exist, when the transmission frequency is lower than the reference threshold, or when the network has not been allocated to the terminal.

According to another aspect of the present invention, a terminal includes a higher level bandwidth manager and a lower level bandwidth manager. The higher level bandwidth manager generates a guaranteed access request message including size information of a bandwidth corresponding to user data, transmits the guaranteed access request message, and transmits a user data transmission message including the user data. The lower level bandwidth manager uses the guaranteed access request message transmitted from the higher level bandwidth manager to generate a bandwidth request message using a guaranteed access, transmits the bandwidth request message to a base station, obtains the user data from the user data transmission message when receiving a bandwidth allocation signal from the base station, and transmits the user data to the base station.

According to still another aspect of the present invention, a terminal includes a higher level bandwidth manager and a lower level bandwidth manager. The higher level bandwidth manager generates a random access request message including size information of bandwidth corresponding to user data and a parameter code for performing a random access, transmits the random access request message, and transmits a user data transmission message including the user data. The lower level bandwidth manager uses the random access request message transmitted from the higher level bandwidth manager to generate a bandwidth request message using the random access, and transmits the random access bandwidth request message to a base station, generates a random access success message when receiving a bandwidth allocation signal from the base station, transmits the random access success message to the higher level bandwidth manager, obtains the user data from the user data transmission message, and transmits the user data to the base station.

BRIEF DESCRIPTION OF THE DRAWINGS

The above and other objects, features and advantages of the present invention will become more apparent from the following detailed description, take in conjunction with the accompanying drawings, in which.

DETAILED DESCRIPTION OF THE EMBODIMENTS

Figure 1:
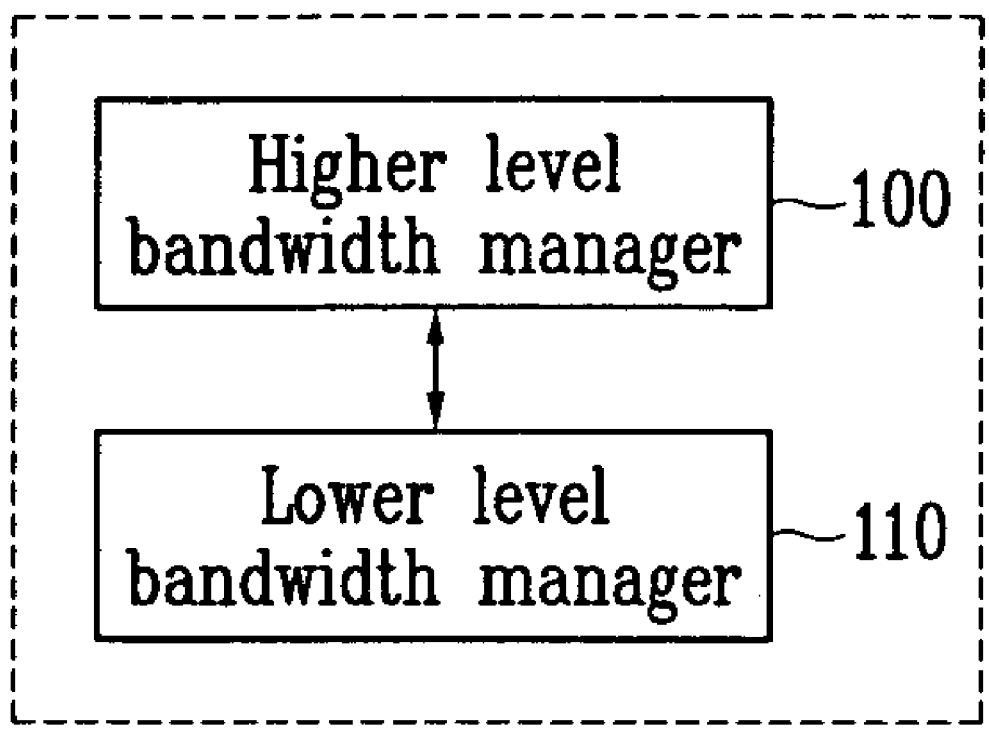
FIG. 1 shows a diagram of a bandwidth management configuration of a terminal according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a diagram of a bandwidth management configuration of a terminal according to an exemplary embodiment of the present invention.

The terminal according to the exemplary embodiment of the present invention includes a higher level bandwidth manager 100 and a lower level bandwidth manager 110.

The higher level bandwidth manager 100 performs a less time-sensitive process to correspond to a frame configuration having a short time period. In this case, the higher level bandwidth manager 100 may perform the less time-sensitive process by using software (SW). Here, the less time-sensitive process includes a controlling process, a calculation process, a statistic process, and a scheduling process.

The lower level bandwidth manager 110 performs a time-sensitive process. In addition, the lower level bandwidth manager 110 may perform the time-sensitive process by using hardware (HW) such as a Field Programmable Gate Array (FPGA) or a Digital Signal Processor (DSP). Here, the time-sensitive process corresponds to a modem controlling process or a transmission timing process.

The higher level bandwidth manager 100 performs a bandwidth scan function, an access method selection function, and a back-off function. Waiting user data are scanned to calculate bandwidth required for the terminal in the bandwidth scan function, and it is determined in the access method selection function whether a guaranteed access is used or a random access is used to transmit the calculated bandwidth to the base station. In the back-off function, a retransmission operation is performed when the random access fails.

The lower level bandwidth manager 110 performs a bandwidth request message transmission function, a piggy back function, and an access method change function.

In the bandwidth request message transmission function, a bandwidth request message for the calculated bandwidth is formed, and the bandwidth request message is transmitted to the base station by using one of guaranteed access and random access. In the piggy back function, the user data are transmitted along with the bandwidth request message when there are enough spaces in the transmitted user data. In the access method change function, a frame is detected, and random access is performed when it is determined that guaranteed access may not be performed.

Figure 2:
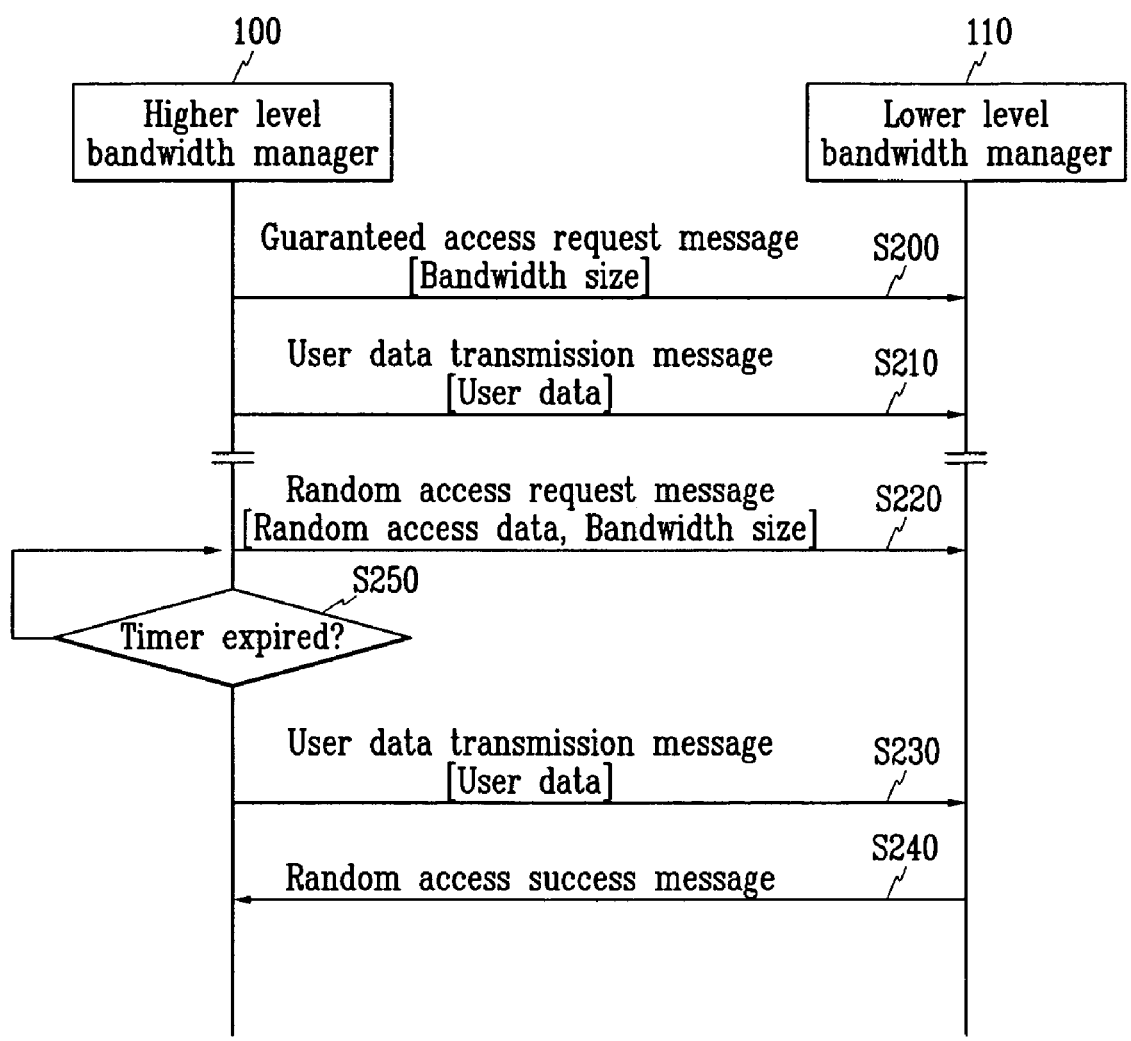
FIG. 2 shows a flow diagram representing a correlation operation between a higher level bandwidth manager and a lower level bandwidth manager according the exemplary embodiment of the present invention.

FIG. 2 shows a diagram representing a correlation operation between the higher level bandwidth manager 100 and the lower level bandwidth manager 110 according to the exemplary embodiment of the present invention.

When determining whether guaranteed access is performed or random access is performed to perform a bandwidth request, the higher level bandwidth manager 100 checks whether a traffic connection identifier (CID) is generated and a network address is allocated, and checks uplink data frequency. In this case, the higher level bandwidth manager 100 selects the guaranteed access when it is determined that many piggy back opportunities are provided, and it selects the random access.

When selecting guaranteed access, the higher level bandwidth manager 100 analyzes the waiting user data to calculate a required bandwidth size. The higher level bandwidth manager 100 transmits a guaranteed access request message including the required bandwidth size to the lower level bandwidth manager 110 in step S200.

In addition, the higher level bandwidth manager 100 transmits a user data transmission message including the user data corresponding to the requested bandwidth to the lower level bandwidth manager 110 in step S210. Subsequently, the lower level bandwidth manager 110 uses the guaranteed access request message including the required bandwidth size received from the higher level bandwidth manager 100 to generate a guaranteed access bandwidth request message, and transmits the generated guaranteed access bandwidth request message to the base station. When the bandwidth is allocated in the base station receiving the guaranteed access bandwidth request message, the lower level bandwidth manager 110 obtains the user data in the user data transmission message received from the higher level bandwidth manager 100 and transmits the user data to the base station.

When selecting random access, the higher level bandwidth manager 100 analyzes the user data to calculate the bandwidth size in a manner similar to guaranteed access.

The higher level bandwidth manager 100 transmits a random access request message including the required bandwidth size and various parameters for performing the random access (e.g., a Code Division Multiple Access (CDMA) code, and a channel symbol) to the lower level bandwidth manager 110 in step S220.

In addition, the higher level bandwidth manager 100 transmits the user data transmission message including the user data corresponding to the requested bandwidth to the lower level bandwidth manager 110 in step S230.

Subsequently, the lower level bandwidth manager 110 uses the random access request message including the required bandwidth size and the various parameters to generate a random access bandwidth request message, and transmits the generated random access bandwidth request message to the base station.

The lower level bandwidth manager 110 obtains the user data from the user data transmission message received from the higher level bandwidth manager 100 and transmits the user data to the base station.

When the bandwidth is allocated in the base station receiving the random access bandwidth request message, the lower level bandwidth manager 110 transmits a random access success message to the higher level bandwidth manager 100 in step 240.

The higher level bandwidth manager 100 operates a timer after transmitting the random access request message, and checks a timer expiration time in step S250.

When it is determined in step S250 that the timer is expired, the higher level bandwidth manager 100 determines that the random access bandwidth request has failed. Subsequently, the higher level bandwidth manager 100 performs the back-off function to perform random access again. Here, the back-off function may be performed a predetermined number of times in the terminal system.

Figure 3:
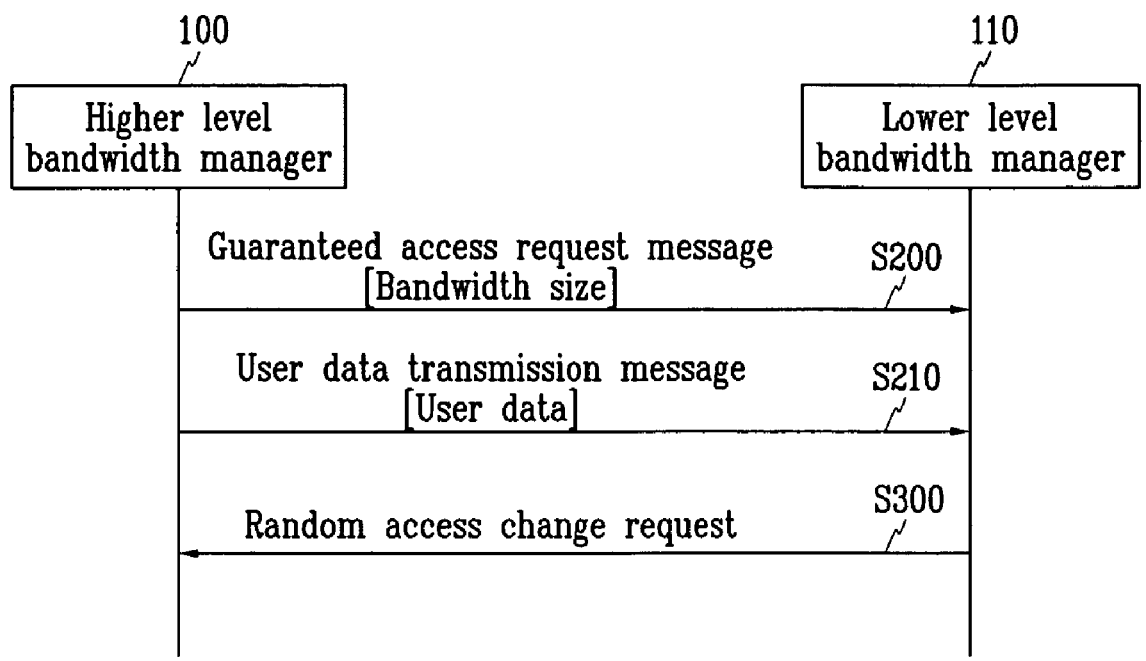
FIG. 3 shows a flow diagram representing a process for requesting a change of a bandwidth access method when a guaranteed access bandwidth request according to the exemplary embodiment of the present invention fails.

FIG. 3 shows a schematic diagram representing a process for requesting a change of a bandwidth access method when the guaranteed access bandwidth request according to the exemplary embodiment of the present invention fails.

When the lower level bandwidth manager 110 requests the bandwidth from the base station by using the guaranteed access, the base station tries to transmit the bandwidth request to an assigned position. However, when the base station does not assign a transmission position for a predetermined frame, the lower level bandwidth manager 110 stops performing the guaranteed access bandwidth request, and requests the higher level bandwidth manager 100 to change the access method in step S300. Subsequently, the higher level bandwidth manager 100 uses random access to request the bandwidth.

Figure 4:
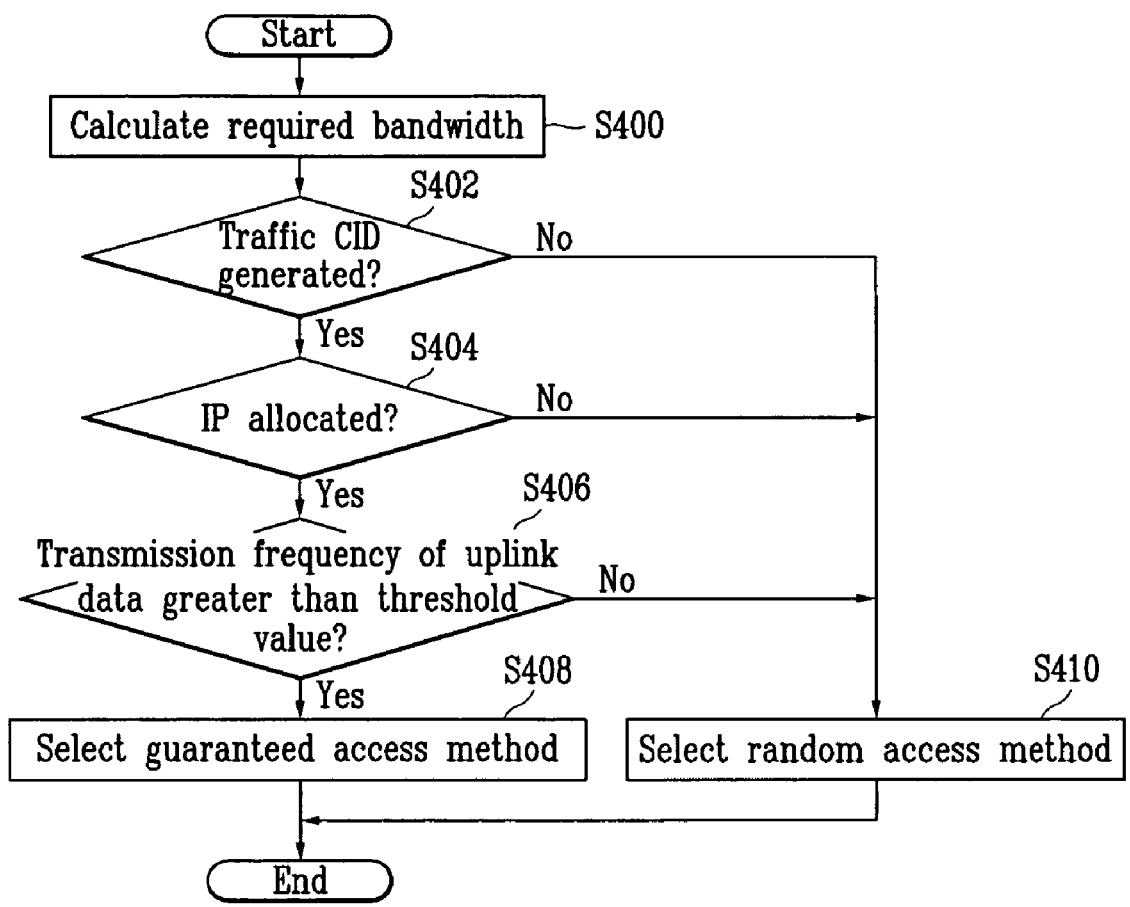
FIG. 4 shows a flowchart for determining an access method when the higher level bandwidth manager according to the exemplary embodiment of the present invention requests the bandwidth.

FIG. 4 shows a flowchart for determining an access method (i.e., random access or guaranteed access) when the higher level bandwidth manager 100 according to the exemplary embodiment of the present invention requests the bandwidth.

The higher level bandwidth manager 100 scans the waiting user data to calculate the bandwidth required for the terminal in step S400.

The higher level bandwidth manager 100 checks in step S402 whether the traffic connection identifier (CID) has been generated.

If that the traffic CID has not been generated, the traffic CID is being registered in the terminal. Therefore, a Media Access Control (MAC) management message is being transmitted.

Accordingly, since the terminal does not transmit/receive the user data, the piggy back function may not be realized. In the piggy back function, the bandwidth request message is provided to a marginal space of the transmitted user data to transmit the bandwidth request message.

Accordingly, the higher level bandwidth manager 100 selects random access in step S410.

When the traffic CID exists, the higher level bandwidth manager 100 checks in step S404 whether a network address has been allocated to the terminal. The network address may be an Internet Protocol (IP) address.

If the network address has been allocated to the terminal, the network address is being allocated to the terminal by a Mobile Internet Protocol (MIP) or a Dynamic Host Configuration Protocol (DHCP).

Accordingly, if the network address is not allocated, the higher level bandwidth manager 100 determines that the terminal does not transmit/receive the user data, and the higher level bandwidth manager 100 selects random access in step S410 rather than selecting the guaranteed access.

When the network address has been allocated to the terminal, the higher level bandwidth manager 100 transmits/receives the user data.

Subsequently, the higher level bandwidth manager 100 checks a transmission frequency of the uplink data and checks in step S406 whether the transmission frequency is higher than a reference threshold.

Since it is difficult to realize the piggy back function when the transmission frequency is not higher than the reference threshold, random access is selected in step S410.

Since it is easy to realize the piggy back function when the transmission frequency is higher than the reference threshold, guaranteed access is selected in step S408. Here, the reference threshold for determining whether the transmission frequency of the uplink data is low or high may be formed by a system parameter.

According to the exemplary embodiment of the present invention, since the bandwidth request method is determined based on a current state of the terminal, the bandwidth management may be efficiently performed.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A terminal comprising:
a higher level bandwidth manager for generating a guaranteed access request message including size information of a bandwidth corresponding to user data, transmitting the guaranteed access request message, and transmitting a user data transmission message including the user data; and
a lower level bandwidth manager for using the guaranteed access request message transmitted from the higher level bandwidth manager to generate a guaranteed access bandwidth request message, transmitting the guaranteed access bandwidth request message to a base station, obtaining the user data from the user data transmission message when receiving a bandwidth allocation signal from the base station, and transmitting the user data to the base station,
wherein the guaranteed access request message and the user data transmission message are transmitted from the higher level bandwidth manager to the lower level bandwidth manager.

2. The terminal of claim 1, wherein the lower level bandwidth manager generates a random access bandwidth request message when the base station does not assign a position for transmitting the guaranteed access bandwidth request message.

3. The terminal of claim 1, wherein the higher level bandwidth manager is processed in a software manner, and the lower level bandwidth manager is processed in a hardware manner.

4. A terminal comprising:
a higher level bandwidth manager for generating a random access request message including size information of a bandwidth corresponding to user data and a parameter code for performing random access, transmitting the random access request message, and transmitting a user data transmission message including the user data; and
a lower level bandwidth manager for using the random access request message transmitted from the higher level bandwidth manager to generate a random access bandwidth request message, transmitting the random access bandwidth request message to a base station, generating a random access success message when receiving a bandwidth allocation signal from the base station, transmitting the random access success message to the higher level bandwidth manager, obtaining the user data from the user data transmission message, and transmitting the user data to the base station,
wherein the random access request message and the user data transmission message are transmitted from the higher level bandwidth manager to the lower level bandwidth manager.

5. The terminal of claim 4, wherein the higher level bandwidth manager is processed in a software manner, and the lower level bandwidth manager is processed in a hardware manner.

* * * * *